US005386505A

United States Patent [19]

Beattie et al.

[11] Patent Number: 5,386,505

[45] Date of Patent: Jan. 31, 1995

[54] SELECTIVE CONTROL OF WINDOW RELATED OVERLAYS AND UNDERLAYS

[75] Inventors: Irene Beattie, Leander; Narendra M. Desai, Round Rock; Michael T. Vanover; John A. Voltin, both of Austin, all of Tex.

[73] Assignee: International Business Machines Corporation, Armonk, N.Y.

[21] Appl. No.: 161,210

[22] Filed: Nov. 30, 1993

Related U.S. Application Data

[63] Continuation of Ser. No. 614,350, Nov. 15, 1990, abandoned.

[51] Int. Cl.[6] .......... G06F 15/62

[52] U.S. Cl. .......... 395/158; 395/135; 345/199

[58] Field of Search .......... 395/155-161, 395/131, 425, 135; 345/118, 119, 120, 186-187, 199; 358/81

[56] References Cited

U.S. PATENT DOCUMENTS

| | | | |
|---|---|---|---|
| 4,194,184 | 4/1979 | Giddings et al. 358 | 358/81 |
| 4,317,114 | 2/1982 | Walker | 340/721 |
| 4,555,775 | 11/1985 | Pike | 395/158 |
| 4,653,020 | 3/1987 | Cheselka et al. | 395/157 |
| 4,682,297 | 7/1987 | Iwami | 364/521 |
| 4,691,295 | 9/1987 | Erwin et al. | 395/425 |
| 4,703,317 | 10/1987 | Shiomi et al. | 340/723 |
| 4,819,189 | 4/1989 | Kikuchi et al. | 395/158 |
| 4,970,664 | 11/1990 | Kaiser et al. | 395/160 |
| 5,001,469 | 3/1991 | Pappas et al. | 340/721 |
| 5,001,697 | 3/1991 | Torres | 395/157 X |
| 5,038,300 | 8/1991 | Seiler et al. | 340/703 X |
| 5,091,720 | 2/1992 | Wood | 395/157 X |
| 5,091,866 | 2/1992 | Takagi | 395/158 |
| 5,093,907 | 3/1992 | Hwong | 395/152 |
| 5,287,448 | 2/1994 | Nicol et al. | 395/159 |

FOREIGN PATENT DOCUMENTS

| | | | |
|---|---|---|---|
| 0456411 | 5/1991 | European Pat. Off. | G09G 5/14 |
| 8302509 | 7/1983 | WIPO | G06R 3/153 |

OTHER PUBLICATIONS

Microsoft Windows Users Guide vol. 3.0, Microsoft Corp., 1990, pp. 16-27, 70-71, 144-157.

McMullen, "Microsoft Introduces Windows 3.0", Newsbytes, May 24, 1990.

"Color-palette Chips Bundle Extra Features with RAM Look-up table and DACs", Electric Design News, Sep. 29, 1988, pp. 67-76.

"Graphics Library User's Guide", vol. 20, Silicon Graphics, Inc., 1988, pp. 6-13-6-15.

"RAMDAC Solves Window Palette Conflicts", Tom Williams. *Computer Design*, vol. 28, No. 19, 1 Oct. 1989.

"Sharing Overlay and Image Planes in the Starbase/X11 Merge System", S. P. Hiebert, J. J. Lang and K. A. Marchington, *Hewlett-Packard Journal*, vol. 40, No. 6, Dec. 1989, pp. 33-38.

*Primary Examiner*—Mark R. Powell
*Assistant Examiner*—John E. Breene
*Attorney, Agent, or Firm*—Casimer K. Salys; Paul S. Drake

[57] ABSTRACT

Apparatus and methods for selectively controlling by window the number of overlay planes, the number of overlay palettes, and the overlay/underlay plane masks in a graphics video display system. A logic/multiplex control translates overlay and underlay data patterns from a multiple plane VRAM (Video Random Access Memory), referenced to the graphics system frame buffer, into window specific patterns. The window related translation is conveyed to conventional RAMDACs (Random Access Memory Digital-to-Analog Converters) for raster scan synchronized digital-to-analog conversion. The translation as provided by the controller is responsive to data selectively and dynamically written into a random access memory, thus providing translation of overlay/underlay data into window distinct and selective overlay/underlay palette functions.

16 Claims, 5 Drawing Sheets

SELECTIVE CONTROL OF WINDOW RELATED OVERLAYS AND UNDERLAYS

This is a continuation of application Ser. No. 07/614,350 filed Nov. 15, 1990 now abandoned.

CROSS-REFERENCE TO RELATED APPLICATIONS

The present application is related to commonly assigned and co-pending U.S. patent application having Ser. No. 07/521,503 and filing date of May 10, 1990. To the extent that the subject matter therein relates hereto, it is incorporated herein by reference.

BACKGROUND OF THE INVENTION

The invention described herein relates generally to the generation of images on a video display system screen. More specifically, the invention relates to apparatus and methods of use which permit the selective relation of overlays and underlays to windows generated for a graphics video display screen.

Computer driven video display systems of contemporary design use windows to highlight or concurrently display multi-process information being conveyed to the user of the system. Given the complex graphics available in contemporary personal computers or workstations, including diverse pull down and pop up menus, multiple windows, and icons, it has become highly desirable to use graphical patterns with fixed orders of hierarchy to ease the "clutter induced confusion" associated with complex operating environments. A particularly important aspect of clarifying the information being portrayed involves the independent linking of patterns to windows.

The aforementioned co-pending application describes apparatus and methods by which overlay patterns can be linked to specific windows. Another form of window data manipulation is described in U.S. Pat. No. 4,653,020, the teaching of which involves a concurrent display of selected data from multiple windows. A digital graphic pattern mixer having functions similar to the RAMDAC (Random Access Memory Digital-to-Analog Converter) discussed herein is disclosed in U.S. Pat. No. 4,149,184. Overlay and cursor priority during a selective merger of image patterns is the subject of U.S. Pat. No. 4,317,114.

The image portrayed on the video display of a contemporary graphics workstation is stored in a memory array known as a frame buffer. The frame buffer is periodically scanned or otherwise accessed to ascertain the color, intensity and like information used to generate the image on the video display. The image as stored in the frame buffer normally includes the effects of windows. Consequently, when a window is removed from view the appropriate underlying image must be regenerated in the changed region of the frame buffer.

Overlays and underlays are two forms of graphic data manipulation which do not change the image as stored in the frame buffer. The advantage of such implementations is that the frame buffer does not have to be modified upon the creation or deletion of the associated graphics patterns. The effects of overlays and underlays for each pixel position are conventionally introduced in the RAMDAC devices which convert digital frame buffer data into analog video output signals. In general, the overlay information supersedes by pixel the related data derived from the frame buffer while the underlaying information supersedes selectively based upon the deletion of a background color. The basic implementation is commonly known.

A representative example of an overlay would be a blinking grid pattern which covers all or part of an image on the video display screen. Similarly, an example of an underlay would be a grid pattern which is coextensive with the background as depicted on a video display screen. As the area of the background changes in response to variations of the foreground image, so to does the underlay. Since neither the overlay nor the underlay are elements of the data stored in the frame buffer, the overlay and the underlay are subject to change without modifying the content of the frame buffer. The use of such overlays and underlays is particularly important in the display of three dimensional graphics images which if modified to add or delete an overlay or underlay would require extensive regeneration activity.

The information represented in overlays, underlays as well as any similarly functioning masking or control planes, is normally stored in planes of a video random access memory array, herein referred to as the control plane VRAM (Video Random Access Memory). The planes in such array are analogous in size to the frame buffer VRAM in terms of pixel count. Preferably, window priority and location information is stored in similar additional planes of the control plane VRAM. The aforementioned co-pending application relates to the selective linking of overlays to windows using such window and overlay data in the control plane VRAM. The focus thereof is the selective control of overlays in the windows to which such overlays relate.

There remains a need for a system and method which can relate the palettes of underlays, as well as overlays, to windows. Furthermore, and in view of the diverse graphic display usage, it would also be desirable to provide the workstation user with the ability to interchangeably use planes within the control plane VRAM for either overlay or underlay functions to most efficiently utilize the limited size of the control plane VRAM.

Commercially available graphic workstation products which provide the ability to relate overlay and underlay patterns to windows exhibit abnormal and somewhat confusing phenomenon, namely color changes in underlays when the cursor is moved between windows having such window linked overlay and underlay patterns. The effect is believed to be a consequence of having too few overlay palettes, or too few user accessible overlay palettes.

Accordingly, there remains a need for a system and method which provides window specific control of overlays and underlays, as well as RAMDAC or independently combined cursor patterns, within the context of conventional frame buffer VRAMs, control plane VRAMs, and RAMDACs.

SUMMARY OF THE INVENTION

The present invention provides the capability to independently relate and control overlay and underlay patterns by window and in conjunction with cursor patterns while using conventional RAMDAC devices for the conversion of patterns into analog format color signals. The invention further provides for the functional interchangeability of control plane data between overlay and underlay modes.

According to one practice of the invention, red, green and blue RAMDACs of conventional design receive color plane data from the frame buffer VRAM for color palette addressing and digital-to-analog conversion. The overlay, underlay and cursor inputs select from an overlay/underlay palette when the overlay, underlay, and cursor signals are to be substituted for the data from the frame buffer. A multiplexer selects whether the frame buffer color palette output or the overlay/underlay palette output is conveyed to the digital-to-analog converter generating the R/G/B (Red/Green/Blue) signals.

The signals selecting from within the overlay/underlay palette are generated in a overlay/underlay/cursor control which logically and selectively combines cursor data with overlay data and underlay data, and relates such to the window plane data. The logical and selective combination can be varied to selectively change the overlay and underlay functions attributed to data in the control plane VRAM. In a preferred form, the window data addresses a control resident memory to define how control plane VRAM data is to be treated in selecting overlay or underlay palettes. The mode selection is to be related to windows by window address. Foremost, the control memory is relatively small and thus subject to a dynamic variation to cycle the relationships and modes.

In an alternative embodiment, the cursor data is conveyed directed to the RAMDAC in lieu of performing logical combination in the overlay/underlay control. In such variant, the control still provides logical and multiplexing operations suitable to relate underlay and overlay palettes to windows.

The invention provides a graphic workstation with the ability to selectively define and dynamically vary overlay and underlay palettes in relation to prescribed windows. Furthermore, the invention optimizes the use of the control plane VRAM storage by allowing an alteration of control plane VRAM planes between overlay and underlay modes. These features are provided within the architectural constraints of a graphic display system having a conventional frame buffer VRAM, a conventional control plane VRAM, and conventional RAMDAC devices.

These and other features of the invention will be understood and appreciated with greater specificity upon considering the detailed description which follows.

DESCRIPTION OF THE PREFERRED EMBODIMENT

Figure 1:
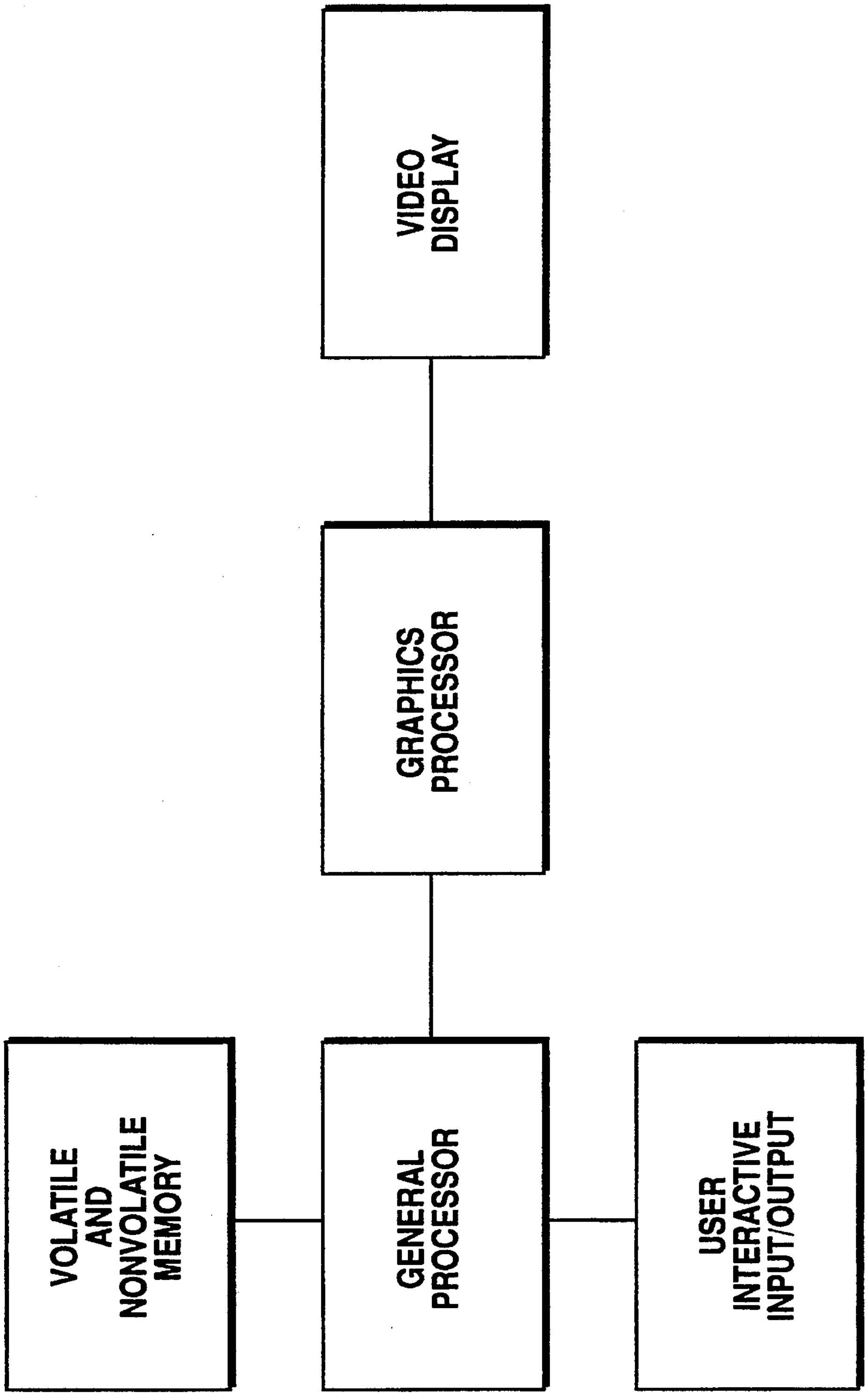
FIG. 1 is a schematic block diagram of the workstation to which the invention relates.

FIG. 1 illustrates by block diagram the elements of a workstation incorporating the present invention. Such workstation is composed of a general processor, a volatile and nonvolatile memory, a user interactive input/output (e.g., keyboard, mouse, printer, etc.), a graphics processor, and a video display responsive to the graphics processor. The invention is directed to a graphics processor having features which improve the operation and usability of the whole system. A representative workstation is the RISC System/6000 (trademark of IBM Corporation) product commercially available from IBM Corporation.

Figure 2:
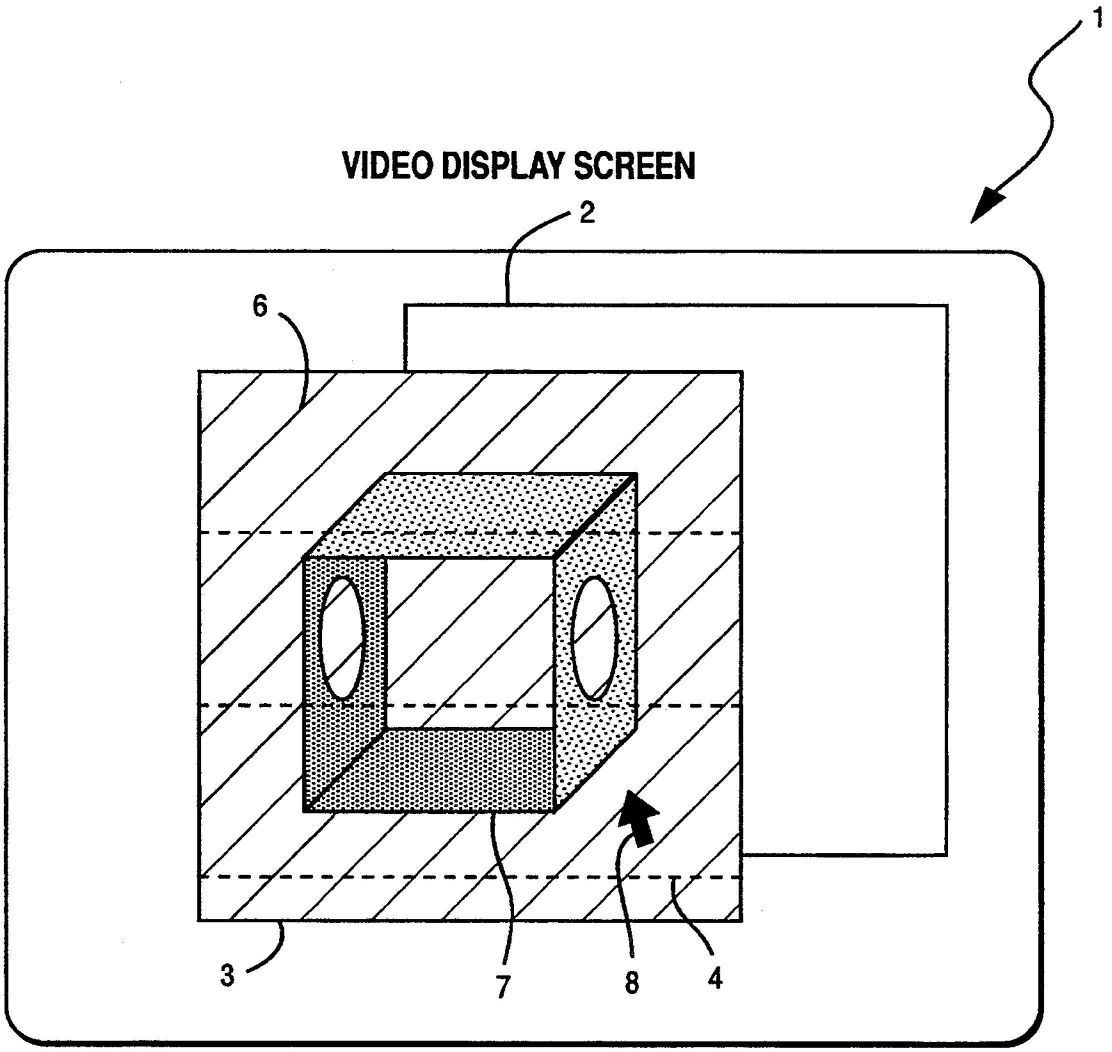
FIG. 2 is a schematic depicting an image on a video display screen.

FIG. 2 illustrates a three dimensional graphic display screen image 1, including first window 2 and second window 3. Also appearing in the screen is a dashed overlay pattern 4, a second window related underlay of diagonal lines 6, a foreground image 7 and a cursor 8. Preferably, the images are created on a video display in response to raster scan synchronized RGB (Red Green Blue) signals generated by the graphics system having the architecture depicted in FIG. 3. The priority of the cursor, overlay, foreground, underlay and frame background images by pixel is set forth in Table A.

TABLE A

| Resource Type | Number Visible | Visibility Priority | Function |
|---|---|---|---|
| Cursor | 1/screen | 1 | Identify active location (pixel) on screen |
| Overlay | 1/window | 2 | Display image which does not require a large number of colors, such as pull-down menus, icons, grids, etc. |
| Fore-ground | 1/window | 3 | Display base image either in full color or pseudo color. |
| Underlay | 1/window | 4 | Produce background pattern (such as diagonal grid pattern) wherever the window background color appears. The underlay does not have to be changed as the frame buffer foreground object changes. |
| Back-ground | 1/window | 5 | Base color upon which the frame buffer foreground image is displayed. |

[1 is the highest visibility priority.]

Figure 3:
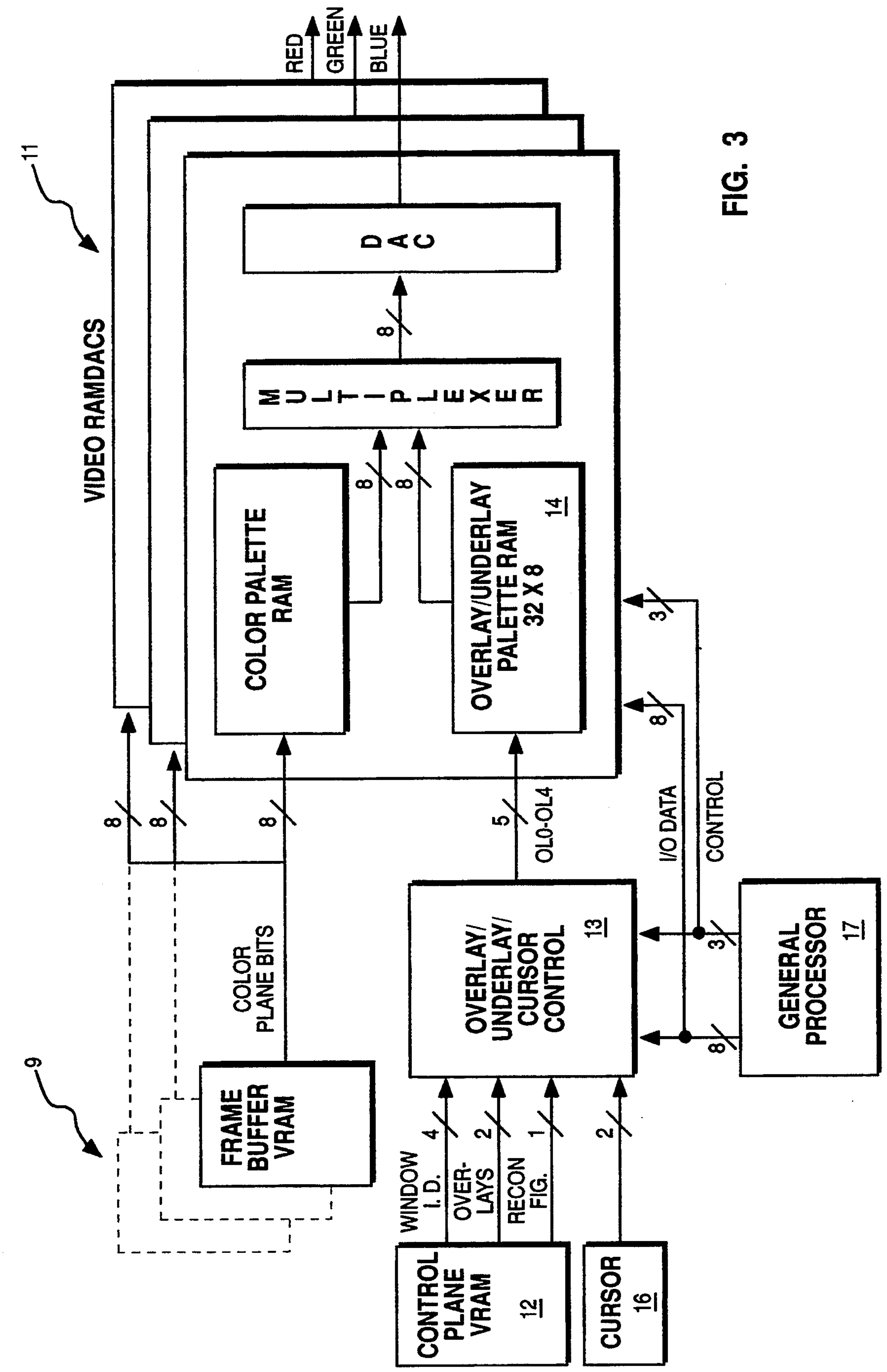
FIG. 3 is a schematic block diagram of a graphics display system architecture.

The graphic display system architecture depicted in FIG. 3 includes multiple planes of frame buffer VRAMs 9, preferably composed of three sets of 8 bit plane VRAMs. Such configuration provides a true color arrangement of 24 bits per pixel, partitioned into 8 bits for red, 8 bits for green, and 8 bits for blue. A pseudo color version uses a frame buffer VRAM of only eight planes, to provide 8 bits and consequently only 256 color combinations per pixel. VRAMs 9 and 12 are video DRAM (Dynamic Random Access Memory) devices of dual port asynchronous design. A representative video RAMDAC 11 is the Brooktree BT461. The preferred arrangement of the system depicted in FIG. 3 uses a separate cursor generator 16, such as the Brooktree BT431. Loading of the palette and control memories is performed by processor 17, a general purpose processor having an I/O (Input/Output) port similar to that of a generic SRAM (Static Random Access Memory). These are conventional devices and usages thereof.

Figure 4:
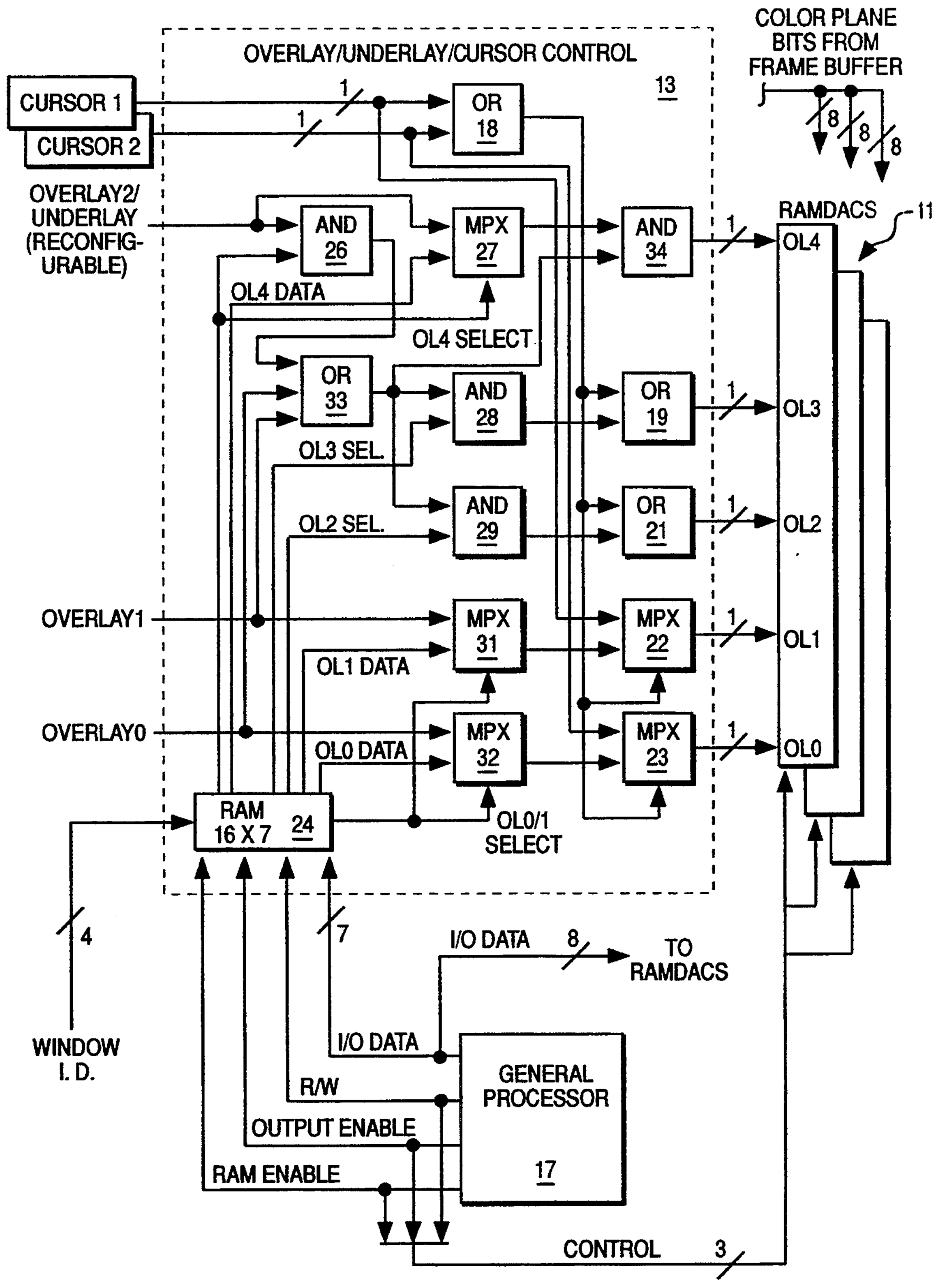
FIG. 4 is a schematic block diagram of the overlay/underlay/cursor control.

FIG. 4 depicts by blocks the logic and selection functions performed within overlay/underlay/cursor control 13. The functional contributions of control 13 are numerous. First, it selectively relates overlay palettes to windows. Second, the control provides the user with the ability to mask off overlay planes. This feature is very useful for overlays which are subject to frequent on-off cycling as appears on the video display screen. Thirdly, the invention allows variation between the number of overlay colors and the number of overlay palettes (e.g., 8 palettes with 3 colors per palette versus 4 palettes with 7 colors per palette). Fourth, the block integrates cursor signals according to the defined priorities of visibility. Overlay versus underlay functionality is defined in RAMDACs 11.

The embodiment depicted in FIG. 4 combines the two cursor inputs in OR block 18, which inputs in both individual and combined forms prevail to control the RAMDAC inputs 0L0–0L3 via OR blocks 19 and 21 and multiplexer blocks 22 and 23. The hierarchy so generated is consistent with the visibility priority defined in Table A for the cursor function. The window identification, overlay, and underlay signals are received from control plane VRAM 12 on the lines identified as window I.D., i.e., overlay0, overlay1, overlay2-/underlay (a reconfigurable input according to the preferred embodiment). The four window I.D. lines identify which of 16 windows prevail at the pixel position then subject to processing. The overlay and underlay inputs define the overlay and underlay effects for such pixel position based upon a combination of the logical translation within control 13 and the data in the overlay/underlay palette 14 (FIG. 5) as selected by the signals on lines 0L0–0L4 of RAMDACs 11.

The data resident in RAM 24 of control 13 is loaded from general processor 17 responsive to a user defined graphics mode, and is conveyed to RAM 24 over the seven lines of the I/O data bus. The 4 bit window I.D. provides a read address to RAM 24, which relates the data in the RAM to one of the 16 windows. Upon such addressing, the seven data lines of RAM 24 selectively drive the logic in multiplexer blocks 26, 27, 28, 29, 31 and 32 in relation to the bit content previously written into RAM 24. Such data signals are combined with the data from control plane VRAM 12 (FIG. 3) as provided on lines overlay0, overlay1, and overlay2/underlay to driving logic blocks 33 and 34 as well as previously noted logic and multiplexer blocks 19, 21, 22 and 23. A example listing of RAM 24 output bits and associated functions is set forth in Table B.

TABLE B

| Bit # | Name | Function When '0' | Function When '1 | Comment |
|---|---|---|---|---|
| B6 | OL4 SEL | OL4 enabled as overlay palette select bit 2. Fixed value per window | OL4 = overlay or underlay. Variable per pixel | — |
| B5 | OL4 DATA | OL4 = overlay palette select bit 2 ='0' | OL4 = overlay palette select bit 2 = '1' | For OL4 SEL = O |
| | | Not used | Not used | For OL4 SEL = 1 |
| B4 | OL3 SEL | OL3 = overlay palette select bit 1 = 'O' | OL3 = overlay palette select bit 1 = '1' | — |
| B3 | OL2 SEL | OL2 = overlay palette select bit O = '0' | OL2 = overlay palette select bit O = '1' | — |
| B2 | OL1 DATA | OL1 = fixed value per window = '0' | OL1 = fixed value per window = '1' | For OL0/1 SEL = O |
| | | Not used | Not used | For OL0/1 SEL = 1 |
| B1 | OL0 DATA | OL0 = fixed value per window = '0' | OL0 = fixed value per window = '1' | For OL0/1 SEL = O |
| | | Not used | Not used | For OL0/1 SEL = 1 |
| B0 | OL0/1 SEL | OL0/1 enabled as fixed data value per window | OVL0/1 = overlay 0/1 | — |

Table C indicates the basic and optional uses of control 13 logic in terms of the visible effects from RAMDACs 11.

TABLE C

| Bit to RAMDAC | Mode | Use |
|---|---|---|
| OL0, OL1 controlled by OL0/1 DATA & OL0/1 SEL | Fixed within window | Overlay plane Mask for basic two overlay bits |
| | or | |
| | Variable per pixel | Basic two overlay bits |
| OL2, 3 controlled by OL2 SEL & OL3 SEL | Fixed within window | Two overlay palette select bits |
| | or | |
| | Variable per pixel | Not supported |
| OL4 controlled by OL4 SEL & OL4 DATA | Fixed within window | Overlay palette select bit |
| | or | or |
| | | overlay plane mask |
| | Variable per pixel | Third overlay bit or First underlay bit. |

The significance of this arrangement resides in the fact that the data in RAM (Random Access Memory) 24 can be reconfigured to serve multiple purposes. For example, the data can serve to set the number of overlay palettes, the number of overlay bits, or even the overlay plane mask functions, without altering the structure of the control plane VRAM or mandating an unconventional design of RAMDACs 11. Additionally, the diversity of function is made window specific, so that the translation is variable from window to window merely by altering the content of very small RAM 24. Furthermore, it should be apparent that such variability lends itself to dynamic variation of such overlay and underlay patterns or palettes to provide visual phenomenon such as blinking of overlay and underlay patterns in select windows.

Table D sets forth a representative translation of overlay, underlay and cursor inputs, as provided on input lines 0L0–0L4 of RAMDACs 11 into video display colors the RAMDACs. The input bits are represented in the first column of data. The second column represents transparency or selected colors for the two overlay situation. The third column includes a mode in which both overlay and underlay functions are invoked. The unused states are an idiosyncrasy of the RAMDACs 11. The fourth column demonstrates operation with three overlay planes.

TABLE D

| OOOOO LLLLL 43210 | 2 OVERLAY PLANES 6 OVERLAY PALETTES 2 CURSOR PALETTES | 2 OVERLAY PLANES 1 UNDERLAY PLANE 3 OVERLAY, 1 CURSOR, & 1 UNDERLAY PALETTE | 3 OVERLAY PLANES 3 OVERLAY PALETTES 1 CURSOR PALETTE |
|---|---|---|---|
| | (Overlay Palette 1) | (Overlay Palette 1) | (Overlay Palette 1) |
| 00000 | Transparent | Transparent | Transparent |
| 00001 | Color 1-1 | Color 1-1 | Color 1-1 |
| 00010 | Color 2-1 | Color 2-1 | Color 2-1 |
| 00011 | Color 3-1 | Color 3-1 | Color 3-1 |
| | (Overlay Palette 2) | (Overlay Palette 2) | (Overlay Palette 2) |
| 00100 | Transparent | Transparent | Transparent |
| 00101 | Color 1-2 | Color 1-2 | Color 1-2 |
| 00110 | Color 2-2 | Color 2-2 | Color 2-2 |
| 00111 | Color 3-2 | Color 3-2 | Color 3-2 |
| | (Overlay Palette 3) | (Overlay Palette 3) | (Overlay Palette 3) |
| 01000 | Transparent | Transparent | Transparent |
| 01001 | Color 1-3 | Color 1-3 | Color 1-3 |
| 01010 | Color 2-3 | Color 2-3 | Color 2-3 |
| 01011 | Color 3-3 | Color 3-3 | Color 3-3 |
| | (Cursor Palette 1) | (Cursor Palette 1) | (Cursor Palette 1) |
| 01100 | Transparent | Transparent | Transparent |
| 01101 | Color 1-C1 | Color 1-C1 | Color 1-C1 |
| 01110 | Color 2-C2 | Color 2-C1 | Color 2-C1 |
| 01111 | Color 3-C3 | Color 3-C1 | Color 3-C1 |
| | (Overlay Palette 4) | — | (Overlay Palette 1) |
| 10000 | Transparent | Underlay color | Color 4-1 |
| 10001 | Color 1-4 | Unused | Color 5-1 |
| 10010 | Color 2-4 | Unused | Color 6-1 |
| 10011 | Color 3-4 | Unused | Color 7-1 |
| | (Overlay Palette 5) | | (Overlay Palette 2) |
| 10100 | Transparent | Unused | Color 4-2 |
| 10101 | Color 1-5 | Unused | Color 5-2 |
| 10110 | Color 2-5 | Unused | Color 6-2 |
| 10111 | Color 3-5 | Unused | Color 7-2 |
| | (Overlay Palette 6) | | (Overlay Palette 3) |
| 11000 | Transparent | Unused | Color 4-3 |
| 11001 | Color 1-6 | Unused | Color 5-3 |
| 11010 | Color 2-6 | Unused | Color 6-3 |
| 11011 | Color 3-6 | Unused | Color 7-3 |
| | (Cursor Palette 2) | | (Cursor Palette 1) |
| 11100 | Transparent | Unused | Transparent |
| 11101 | Color 1-C2 | Unused | Color 1-C1 |
| 11110 | Color 2-C2 | Unused | Color 2-C1 |
| 11111 | Color 3-C2 | Unused | Color 3-C1 |

Figure 5:
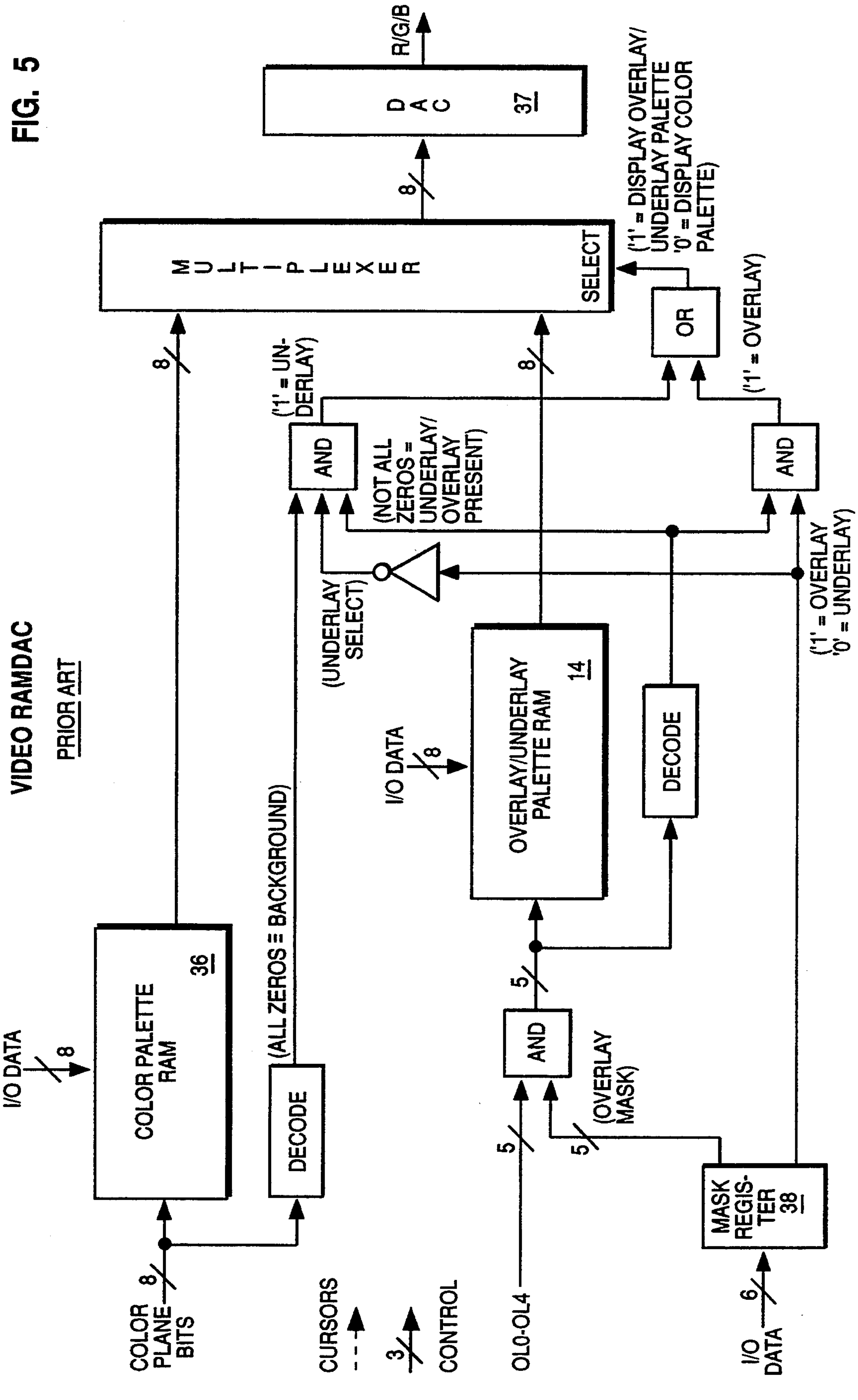
FIG. 5 is a schematic block diagram of a conventional RAMDAC.

The architecture of a representative video RAMDAC 11 appears in FIG. 5. The overlay/underlay palette RAM 14 and color palette RAM 36 are loaded from general processor 17 (FIG. 4) to define the translation between the input bits and the digital format color data sent to digital-to-analog converter 37. The functions are well known by users of commercial RAMDACs.

Overlay/underlay/cursor control 13 in FIG. 4 and RAMDAC 11 as depicted in FIG. 5 are based on a RAMDAC architecture which does not have cursor management capability internal to the RAMDAC. When using RAMDACs with internal cursor control, the logic and multiplexer functions relating to the cursor as depicted in FIG. 4 are superfluous.

Control 13 as depicted in FIG. 4 provides for distinct modes of operation. In the first mode, four of the five outputs, OL0–OL3, are forced to specific states to guarantee cursor visibility. Thus only OL4 is variable per window to select between two cursor palettes. In the overlay mode of operation, where the overlay2/underlay input is assumed to be unavailable, the overlay inputs overlay0 and overlay1 are passed directly to outputs OL0 and OL1 of the RAMDACs, selecting one of three colors per pixel. OL2, OL3 and OL4 are individually controlled by window to select between six overlay palettes.

In an overlay transparency mode of operation both overlay0 and overlay1 are at zero state, forcing lines OL0–OL4 to respective zero states. Under these conditions RAMDAC 11 treats the overlay as a transparency.

The final mode of operation is the underlay, where the overlay2/underlay input line is the path for the underlay data. In this mode, the number of overlay palettes is reduced from six to three and the number of cursor palettes is reduced from two to one. The RAMDAC mask register, reference 38 in FIG. 5, is set to enable underlay and to mask off OL4 for an overlay. This state can be varied at a rate consistent with a screen refresh rates so that all overlays are affected except those using palettes 1, 2 or 3 as defined in Table C. The reconfigurable bit, overlay2/underlay, is passed through to OL4 to control the underlay by pixel. RAMDAC inputs OL0–OL3 are forced to specific states as required by the RAMDAC, thus the RAMDAC will display the underlay color only if the underlay bit OL4 is "1" and the color plane address is all zeros. This color plane address represents the background color.

The invention as described herein thus provides a system and method of use for controlling overlay and underlay palettes in relation to specific windows. The selectivity is dynamically variable by modifying the content of a RAM to redefine logic and multiplexing functions within a controller. A preferred implementation uses window addresses to select RAM data. The cursor function may be integrated into such controller or, where the RAMDAC so provides, conveyed directly to the RAMDAC cursor input.

Though the invention has been described and illustrated by way of specific embodiments, the apparatus and methods should be understood to encompass the full scope of the structures and practices defined by the claims set forth hereinafter.

We claim:

1. An apparatus for displaying patterns in windows in a video display system, comprising:

means for defining a plurality of windows for concurrent display in a video display system, each window having an associated image stored in an image frame buffer for display using a frame buffer palette;

means for defining an overlay pattern for the video display system, said overlay pattern being stored in an independent buffer independent of each said image frame buffer;

means for defining an underlay pattern for the video display system, said underlay pattern being stored in the independent buffer independent of each said image frame buffer; and means for selectively associating each overlay and underlay pattern to at least one independent palette stored independent of said frame buffer palette so that display colors of each overlay and underlay pattern are provided by said at least one independent palette, each independent palette being associated with at least one window so that overlay and underlay patterns are selectively displayed in associated windows.

2. The apparatus recited in claim 1, wherein the means for selectively associating utilizes window addresses to selectively associate an overlay pattern and an underlay pattern to palettes associated with at least one window.

3. The apparatus recited in claim 2, wherein the means for selectively associating includes selectively associating display priority of an overlay pattern and an underlay pattern to independent palettes.

4. The apparatus recited in claim 3, wherein the window addresses are utilized to selectively associate display priority of the overlay and underlay patterns to palettes.

5. The apparatus recited in claim 4, further comprising:

means for defining a cursor pattern for the video display system; and means for applying the cursor pattern to a cursor palette.

6. The apparatus recited in claim 5, wherein the overlay and underlay patterns have lower display priority than the cursor pattern in the means for applying the cursor pattern.

7. A method for displaying overlay and underlay patterns in windows in a video display system, comprising the steps of:

defining a plurality of windows for concurrent display in the video display system, each window having an associated image stored in an image frame buffer for display using a frame buffer palette;

defining an overlay pattern for the video display system, said overlay pattern being stored in an independent buffer independent of each said image frame buffer;

defining an underlay pattern for the video display system, said underlay pattern being stored in an independent frame buffer independent of each said image frame buffer; and selectively associating each overlay and underlay pattern to at least one independent palette stored independent of said frame buffer palette so that display colors of each overlay and underlay pattern are provided by said at least one independent palette, each independent palette being associated with at least one window so that overlay and underlay patterns are selectively displayed in associated windows.

8. The method recited in claim 7, wherein the step of selectively associating includes utilizing window addresses to selectively associate the overlay pattern and the underlay pattern to palettes associated with at least one window.

9. The method recited in claim 8, comprising the further steps of:

defining a cursor pattern for the video display system; and applying the cursor pattern to a cursor palette.

10. The method recited in claim 9, wherein the overlay and underlay patterns have lower display priority than the cursor pattern during the step of applying the cursor pattern.

11. A system for controlling overlays and underlays in a display system, comprising:

a frame buffer memory for storing data for display;

a memory for storing a plurality of windows for concurrent display using a frame buffer palette;

a memory for storing overlay and underlay patterns, each said overlay and underlay pattern being stored in an independent buffer independent of each said frame buffer memory;

means for providing palette data associated with at least one window; and logical means for selectively associating each overlay and underlay pattern to palette data stored in at least one independent palette stored independent of said frame buffer palette so that display colors of each overlay and underlay pattern are provided by said at least one independent palette.

12. The system recited in claim 11, further comprising a digital-to-analog controller means responsive to the logical means for selectively relating and for generating video display system color data combining effects of window, overlay and underlay patterns and palettes.

13. The system of recited in claim 12, further comprising:

means for defining a cursor pattern; and means for applying the cursor pattern to a cursor palette.

14. The system recited in claim 13, wherein the overlay and underlay patterns have lower display priority than the cursor pattern in the means for applying the cursor pattern.

15. The system recited in claim 14, further comprising a digital-to-analog converter means for logically combining to generate video display color data combining the effects of window, overlay, underlay, and cursor patterns and palettes.

16. A workstation system having overlays and underlays, comprising:

a general processor;

a memory for the general processor;

user interactive input/output for the general processor;

a video display; and a graphics processor means responsive to the general processor for controlling the video display and comprising:

a frame buffer memory for storing data for display;

a memory for storing a plurality of windows for concurrent display using a frame buffer palette;

a memory for storing overlay and underlay patterns, each said overlay and underlay pattern being stored in and independent buffer independent of each said frame buffer memory;

means for providing palette data associated with at least one window; and logical means for selectively associating each overlay and underlay pattern to palette data stored in at least one independent palette stored independent of said frame buffer palette so that display colors of each overlay and underlay pattern are provided by said at least one independent palette.

* * * * *